(12) United States Patent
Kaesgen et al.

(10) Patent No.: US 6,913,104 B2
(45) Date of Patent: Jul. 5, 2005

(54) SHIFT INTERLOCK MECHANISM

(75) Inventors: Hartmut Kaesgen, Berea, OH (US); E. Ray Goodwin, Jr., N. Olmsted, OH (US); Bryan Gochneaur, Medina, OH (US)

(73) Assignee: MTD Products Inc, Valley City, OH (US)

( * ) Notice: Subject to any disclaimer, the term of this patent is extended or adjusted under 35 U.S.C. 154(b) by 119 days.

(21) Appl. No.: 10/373,599

(22) Filed: Feb. 26, 2003

(65) Prior Publication Data

US 2004/0163876 A1 Aug. 26, 2004

(51) Int. Cl.$^7$ .............................................. B60K 41/22
(52) U.S. Cl. ...................... 180/336; 192/3.63; 192/219
(58) Field of Search ................................ 180/315, 336; 192/3.63, 219, 220, 220.1, 220.2, 220.3

(56) References Cited

U.S. PATENT DOCUMENTS

| | | |
|---|---|---|
| 1,210,640 A | 1/1917 | Goldmerstein |
| 1,211,925 A | 1/1917 | Dobbel |
| 1,223,906 A | 4/1917 | Schermerhorn |
| 1,259,228 A | 3/1918 | Groves, Jr. |
| 1,582,236 A | 4/1926 | Anderson |
| 1,619,955 A | 3/1927 | Reinhard |
| 1,908,907 A | 5/1933 | Lessler |
| 2,248,747 A | 7/1941 | Dick |
| 2,609,074 A | 9/1952 | Leihgeber |
| 2,927,475 A | 3/1960 | Burckhardt |
| 2,936,864 A | 5/1960 | Schjolin et al. |
| 3,169,616 A | 2/1965 | Hunsaker et al. |
| 3,480,120 A | 11/1969 | Lenzen et al. |
| 3,780,839 A | 12/1973 | Schroeder |
| 3,842,653 A | 10/1974 | Blonn, Sr. |
| 3,912,050 A | 10/1975 | Iwanaga et al. |
| 3,942,614 A | 3/1976 | Thompson |
| 4,096,930 A | 6/1978 | Viscardi |
| 4,187,935 A | 2/1980 | O'Hem |
| 4,231,241 A | 11/1980 | Lipski |
| 4,301,901 A * | 11/1981 | Jensen ..................... 192/219.6 |
| 4,555,962 A | 12/1985 | Bucarelli |
| 4,572,340 A | 2/1986 | Pierce |
| 4,844,227 A | 7/1989 | Crawford et al. |
| 4,887,702 A | 12/1989 | Ratke et al. |
| 4,917,224 A | 4/1990 | Gokee |
| 4,919,242 A | 4/1990 | Muramatsu et al. |
| 4,932,493 A | 6/1990 | Sakurai et al. |
| 4,938,042 A | 7/1990 | Muramatsu |
| 4,942,937 A | 7/1990 | Amberger et al. |
| 4,947,967 A | 8/1990 | Kito et al. |
| 4,966,262 A | 10/1990 | Mieczkowski |
| 4,976,171 A | 12/1990 | Sharp et al. |
| 4,986,399 A | 1/1991 | Gokee |

(Continued)

FOREIGN PATENT DOCUMENTS

JP 01095942 A * 4/1989 ........... B60K/20/02

*Primary Examiner*—David R. Dunn
(74) *Attorney, Agent, or Firm*—Wegman Hessler & Vanderburg

(57) ABSTRACT

A shift interlock mechanism that requires an operator to press a brake mechanism before changing transmission gears to prevent extra motion in the transmission, insuring a smoother shifting operation. The shift interlock mechanism with a brake arm that moves in a first direction to stop motion of at least a first ground engaging drive wheel and a shift arm that moves in a second direction to change movement of a vehicle.

21 Claims, 10 Drawing Sheets

U.S. PATENT DOCUMENTS

| | | |
|---|---|---|
| 5,003,799 A | 4/1991 | Imai et al. |
| 5,018,610 A | 5/1991 | Rolinski et al. |
| 5,022,504 A | 6/1991 | Kobayashi |
| 5,027,931 A | 7/1991 | Ratke et al. |
| 5,031,737 A | 7/1991 | Dzioba et al. |
| 5,036,962 A | 8/1991 | Amagasa |
| 5,050,411 A | 9/1991 | Kawachi et al. |
| 5,062,509 A | 11/1991 | Carpenter et al. |
| 5,096,033 A | 3/1992 | Osborn |
| 5,129,494 A | 7/1992 | Rolinski et al. |
| 5,133,436 A | 7/1992 | de Crouppe et al. |
| 5,161,657 A | 11/1992 | Papenhagen et al. |
| 5,176,231 A | 1/1993 | Moody et al. |
| 5,181,592 A | 1/1993 | Pattock |
| 5,211,271 A | 5/1993 | Osborn et al. |
| 5,257,551 A | 11/1993 | Iwata |
| 5,289,907 A | 3/1994 | Pattock |
| 5,314,049 A | 5/1994 | Nordstrom |
| 5,456,133 A | 10/1995 | Sogo et al. |
| 5,511,641 A | 4/1996 | Snell et al. |
| 5,562,568 A | 10/1996 | Smale |
| 5,566,587 A | 10/1996 | Sogo et al. |
| 5,588,514 A | 12/1996 | Snell |
| 5,647,464 A | 7/1997 | Snell et al. |
| 5,647,818 A | 7/1997 | Moody |
| 5,685,405 A | 11/1997 | Morikawa et al. |
| 5,695,429 A | 12/1997 | Kataumi et al. |
| RE35,772 E | 4/1998 | Ratke et al. |
| 5,752,414 A | 5/1998 | Reasoner et al. |
| 5,775,165 A * | 7/1998 | Lu .......................... 74/473.28 |
| 5,775,166 A | 7/1998 | Osborn et al. |
| 5,797,295 A | 8/1998 | Kataumi et al. |
| 5,842,384 A | 12/1998 | Berger |
| 5,846,158 A | 12/1998 | Tazai |
| 5,862,899 A | 1/1999 | Dahlstrom |
| 5,906,120 A | 5/1999 | Thacker et al. |
| 5,996,763 A | 12/1999 | Tsuge |
| 6,006,887 A | 12/1999 | Tazai |
| 6,059,687 A | 5/2000 | Durieux et al. |
| 6,142,282 A | 11/2000 | Rudisil et al. |
| 6,161,672 A | 12/2000 | Maeda et al. |
| 6,332,524 B1 * | 12/2001 | Shin ....................... 192/220.2 |
| 6,371,271 B1 * | 4/2002 | Hong ..................... 192/220.3 |

\* cited by examiner

SHIFT INTERLOCK MECHANISM

I. BACKGROUND OF THE INVENTION

A. Field of Invention

This invention relates to apparatuses and methods concerning shifting and braking of vehicles and, more specifically, to a shift interlock mechanism used on a utility vehicle.

B. Description of the Related Art

It is known in the art to provide vehicles with means of braking and of shifting between various forms of motion, such as reverse, neutral and forward drive. It is also known to require that the operator activate the braking system before the vehicle's transmission can be adjusted between drive gears. For example, it is known in the automotive industry to require that the brake pedal be pressed before the operator can shift the automobile from a forward drive into a reverse drive. However, such known mechanisms, although generally well functioning for their intended purpose, are often complex and, thus, expensive to produce. Thus, what is needed is a simple shift interlock mechanism that will require the operator to press a brake mechanism before changing transmission gears and will do so in a way to prevent extra motion in the transmission, thereby insuring a smoother shifting operation.

II. SUMMARY OF THE INVENTION

One object of this invention is to prevent the operator of a vehicle from shifting the transmission until a brake mechanism is activated.

Another object of this invention is to cause the input shaft to the transmission to stop rotating on engagement of the brake mechanism.

Still another object of this invention is to provide for sequential operation, namely, that, when the operator engages the brake mechanism, the input to the transmission is first stopped and then the operator is permitted to change the gearing in the transmission.

One advantage to this invention is that the operator is prevented from damaging the transmission by changing drive positions in the transmission too quickly.

Another advantage of this invention is that the sequential operation of the interlock mechanism provides for smooth shifting.

One aspect of the present invention is a shift interlock mechanism comprising a brake arm, a shift arm, and a cable operatively connecting the brake arm to the shift arm.

Another aspect of this invention is a shift interlock mechanism with a supporting means adapted to a brake arm at a first pivot point and adapted to a shift arm at a second pivot point.

Still another aspect of this invention is a shift interlock mechanism with a cable adapted on a brake arm at a distance X1 from a first pivot point and a distance X2 from a second pivot point.

According to yet another aspect of this invention, a cable that biases a first end of a brake arm in a first direction and a first end of a shift arm in a second direction.

Yet another aspect of the present invention, a shift interlock mechanism with a cable that biases a brake arm into engagement with a torque converter of a transmission assembly, stopping motion of the torque converter and gears of the transmission assembly.

Still another aspect of the present invention, a shift interlock mechanism with a shift arm comprising a plurality of grooves and a member adapted to be received in one of the plurality of grooves where the member is adapted to one of the plurality of grooves upon movement of a shift arm in a direction opposite the movement of a brake arm.

Still other benefits and advantages of this invention will become apparent to those skilled in the art to which it pertains upon a reading and understanding of the following detailed specification.

III. BRIEF DESCRIPTION OF THE DRAWINGS

As follows, the invention may take physical form in certain parts and arrangement of parts, a preferred embodiment of which will be described in detail in this specification and illustrated in the accompanying drawings which form a part hereof and herein:

IV. DESCRIPTION OF THE PREFERRED EMBODIMENT

Figure 1:
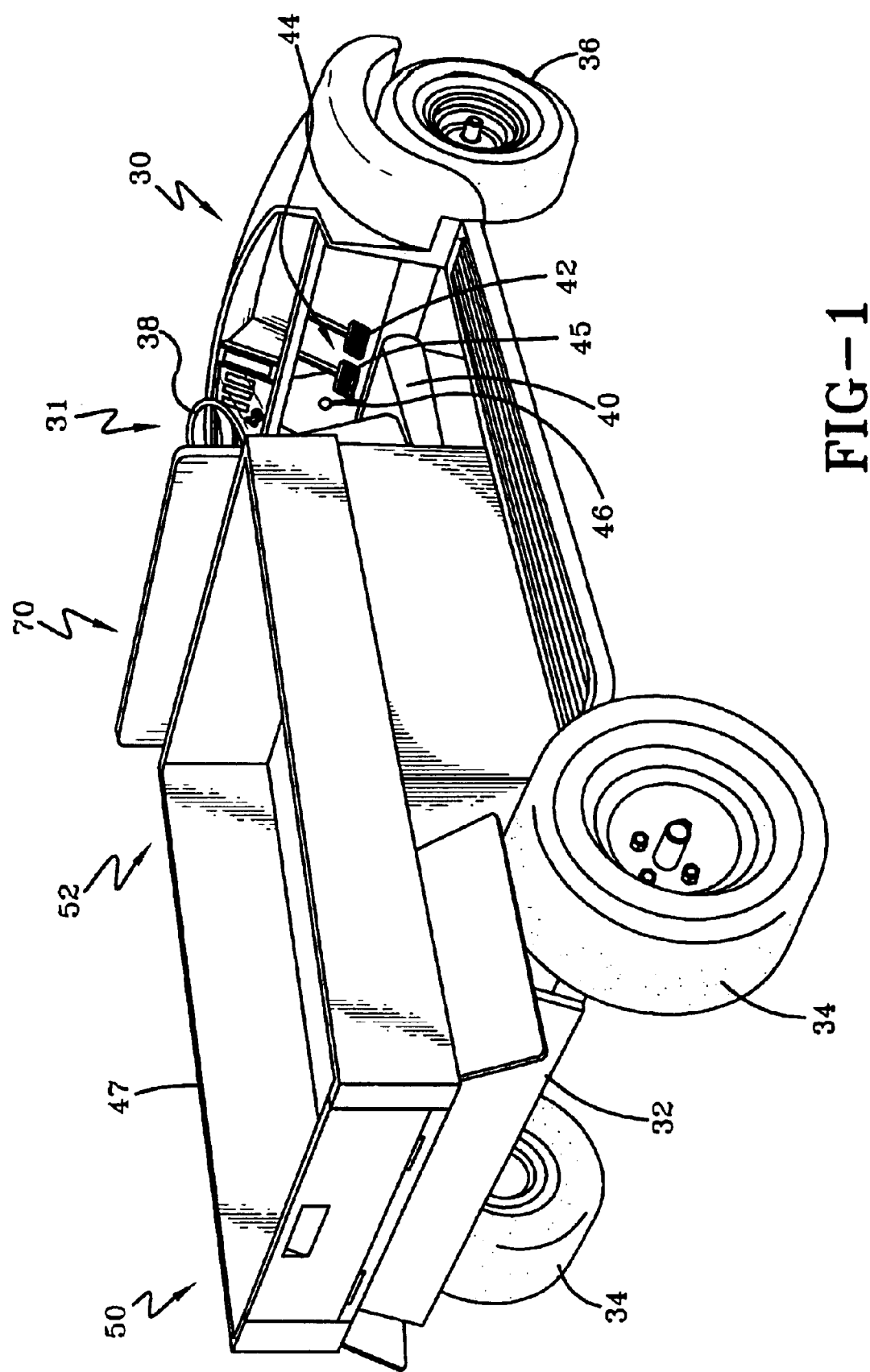
FIG. 1 is a perspective view of a utility vehicle equipped with a shift interlock mechanism of this invention.
Figure 2:
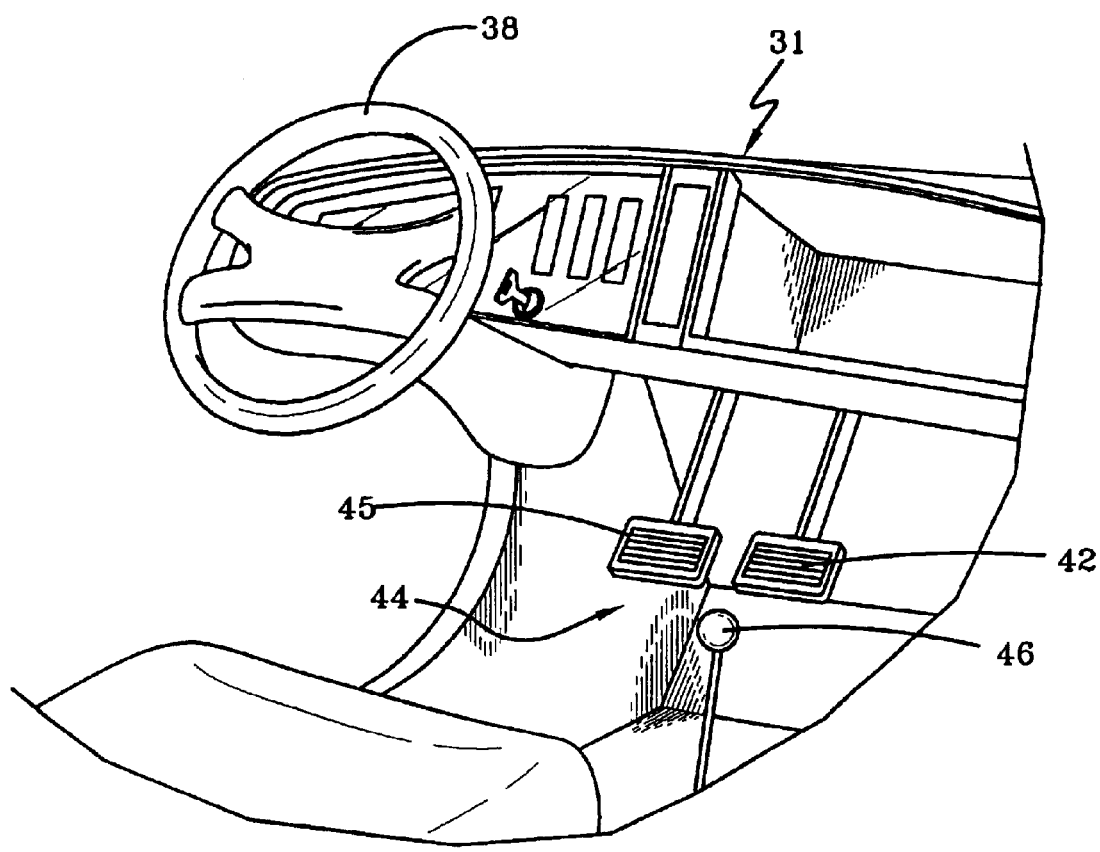
FIG. 2 is a partial view of the operator compartment of the utility vehicle shown in FIG. 1.
Figure 3:
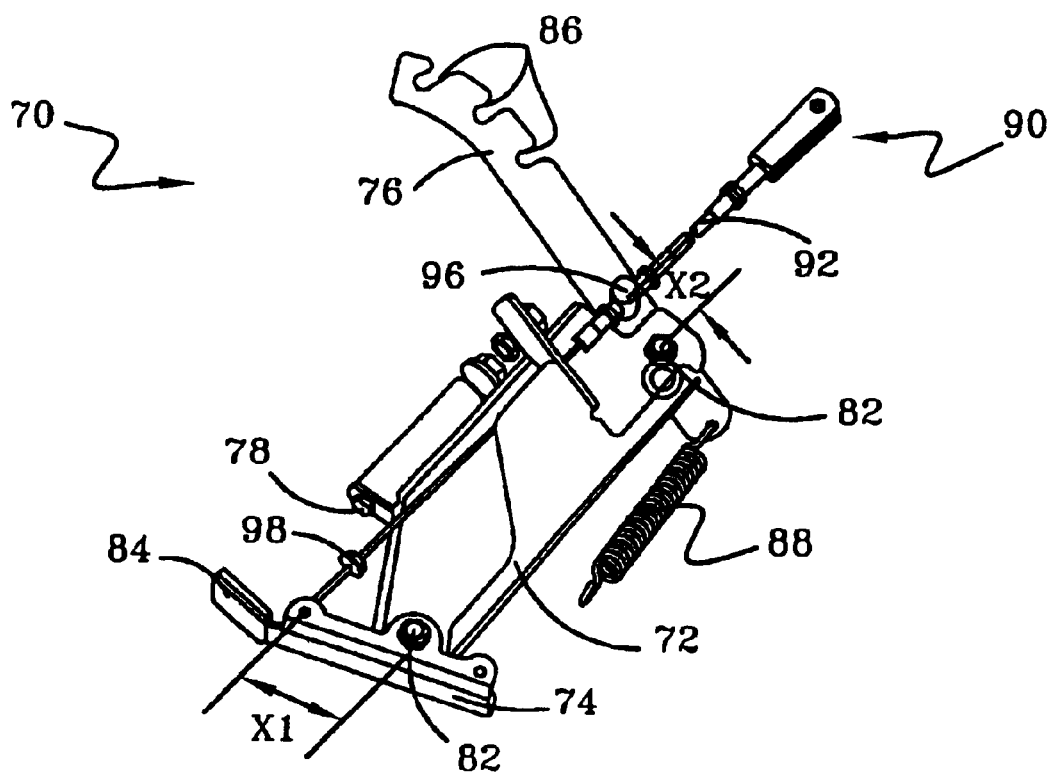
FIG. 3 is a bottom view of the inventive shift interlock mechanism.
Figure 4:
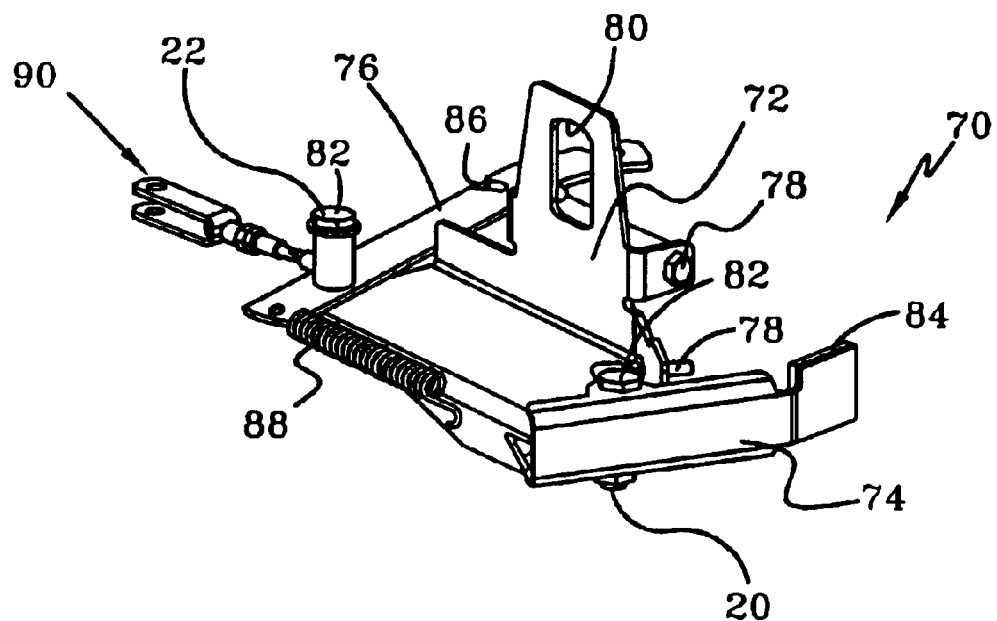
FIG. 4 is a perspective view of the shift interlock mechanism shown in FIG. 3.
Figure 5:
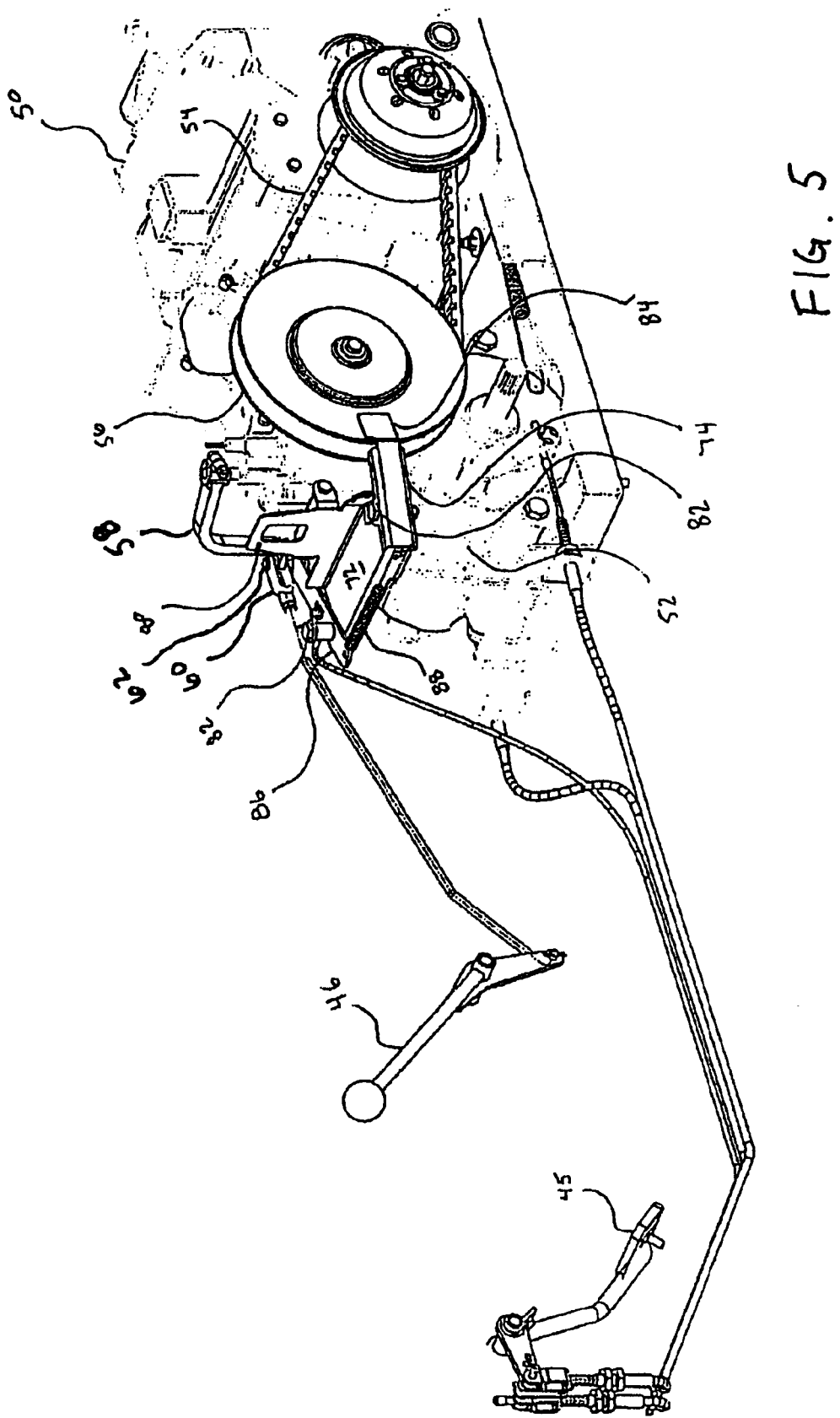
FIG. 5 is a perspective view of a portion the utility vehicle showing the transmission.

Referring now to the drawings wherein the showings are for purposes of illustrating a preferred embodiment of the invention only and not for purposes of limiting the same, FIG. 1 shows a vehicle 30 equipped with a shift interlock mechanism 70 according to this invention. Although the vehicle 30 is a utility vehicle, it should be noted that the shift interlock mechanism 70 of this invention is applicable to other vehicles as well. The vehicle 30 includes a frame 32 with back wheels 34 and front wheels 36 operatively connected to the frame 32. In the preferred embodiment, the back wheels 34 are ground-engaging drive wheels, while the front wheels 36 are ground engaging steerable wheels. It should also be noted that, while the embodiment shown includes two drive wheels, additional drive wheels could optionally be provided. The vehicle 30 also includes an operator station 31 (seen in close-up in FIG. 2) that includes a steering device 38 for turning the front wheels 36. The operator station 31 also includes at least one seat 40 where the operator may sit during operation of the vehicle 30. The operator station 31 also includes an acceleration pedal 42, a braking mechanism 44 having preferably a braking member 45 that may be a brake pedal (as shown) and a shift lever 46. Of course other braking members 45 known in the art, such as a lever or a hand braking means, may also be used to activate the braking mechanism 44. The shift lever 46 for the vehicle shown has three optional positions, namely, forward, neutral and reverse. However, it should be understood that the shift interlock mechanism of this invention would work equally well with other shifting options including transmissions that provide for various forward and/or reverse positions. The connection between the brake mechanism 44 and the shift lever 46 with the shift interlock mechanism 70 will be discussed further below. The vehicle 30, shown, may also include a bed 47 equipped to carry and transport items, as desired.

With reference now to FIGS. 1 and 5–8, below the bed 47 is the drive mechanism 48 used to propel the vehicle 30. The drive mechanism 48 includes an engine 50 operatively connected to a transmission 52. The transmission is then operatively connected to the drive wheels 34 in any manner commonly known in the art. The engine 50 and transmission 52 can be of any type chosen with sound engineering judgment. In the preferred embodiment, the output of the engine 50 rotates a torque converter 56 of the transmission via drive belt 54. As is commonly known in the art, the torque converter is rigidly connected to the input shaft of the transmission 52. Operatively attached to the transmission 52 is a shift member 58. Operatively connected to a distal end of the shift member 58 is shift rod 60, which is operatively connected to the shift lever 46 in the operator station 31. Thus, it should be understood that, as the operator adjusts the position of the shift lever 46, the shift rod 60 and, thus, the shift member 58 is correspondingly adjusted. In particular, in the preferred embodiment, the operator has the option of positioning the transmission 52 into forward, neutral and reverse positions. As seen best in FIGS. 5 and 8, an engaging member or pin 62 pivotally connects the shift rod 60 to the shift member 58.

With reference now to FIGS. 3–11, the shift interlock mechanism 70 will now be described. The shift interlock mechanism 70 includes a connecting means that may be a bracket 72, a brake arm 74 pivotally connected to the bracket 72 at a first pivot point 20, and a shift arm 76, also pivotally connected to the bracket 72 at a second pivot point 22. The bracket 72 is preferably fixedly attached to the transmission 52, such as by using bolts 78. Preferably, the bracket 72 includes a lift handle 80 for use in positioning the transmission 52 and shift interlock mechanism 70, as a unit, into the vehicle 30. Both the brake arm 74 and the shift arm 76 are pivotally connected to the bracket 72, using pivot bolts 82. The brake arm 74 has a first end with a pad 84 used to intersect and "clutch" or contact or engage an outer surface of the torque converter 56 (as seen best in FIG. 6). Thus, when the brake arm 74 is in the appropriate position, the pad 84 engages with the outer surface of the torque converter 56, thereby, stopping the rotation of the torque converter, stopping the rotation of the input shaft to the transmission and stopping all gear motion within the transmission. This permits smoother shifting and prevents undesirable gear intermeshing sounds that occur when shifting is permitted without stopping the transmission input shaft first. It should be noted that this invention works equally well with any manner by which the brake arm 74 intersects or clutches with the torque converter 56.

The shift arm 76 has a first end with a plurality of grooves 86 formed thereon. The grooves 86 are used to receive the engaging member or pin 62 that pivotally connects the shift rod 60 to the shift member 58. Thus, when the shift arm 76 is in the appropriate position, the grooves 86 lock or hold or engage the shift member 58 into a position. In the preferred embodiment shown, there are three grooves 86, one for forward, one for neutral and one for reverse driving conditions. It should be understood that this invention works equally well when the shift arm 76 is selectively connectable to the shift member 58 by other means known in the art. In another embodiment (not shown) there may be various forward and reverse driving conditions. Thus the shift arm may change vehicle movement from one forward drive condition to a second forward drive condition or to any number of reverse drive conditions or to a neutral driving condition. A biasing means 88 that preferably is a spring, has ends operatively connected to second ends of both the brake arm 74 and the shift arm 76. Thus, it should be understood that this spring 88 biases the brake arm into non-engagement with the torque converter 56, while simultaneously biasing the shift arm 76 into a lock condition with the pin 62 and, thus, the shift member 58 and shift lever 46.

Figure 6:
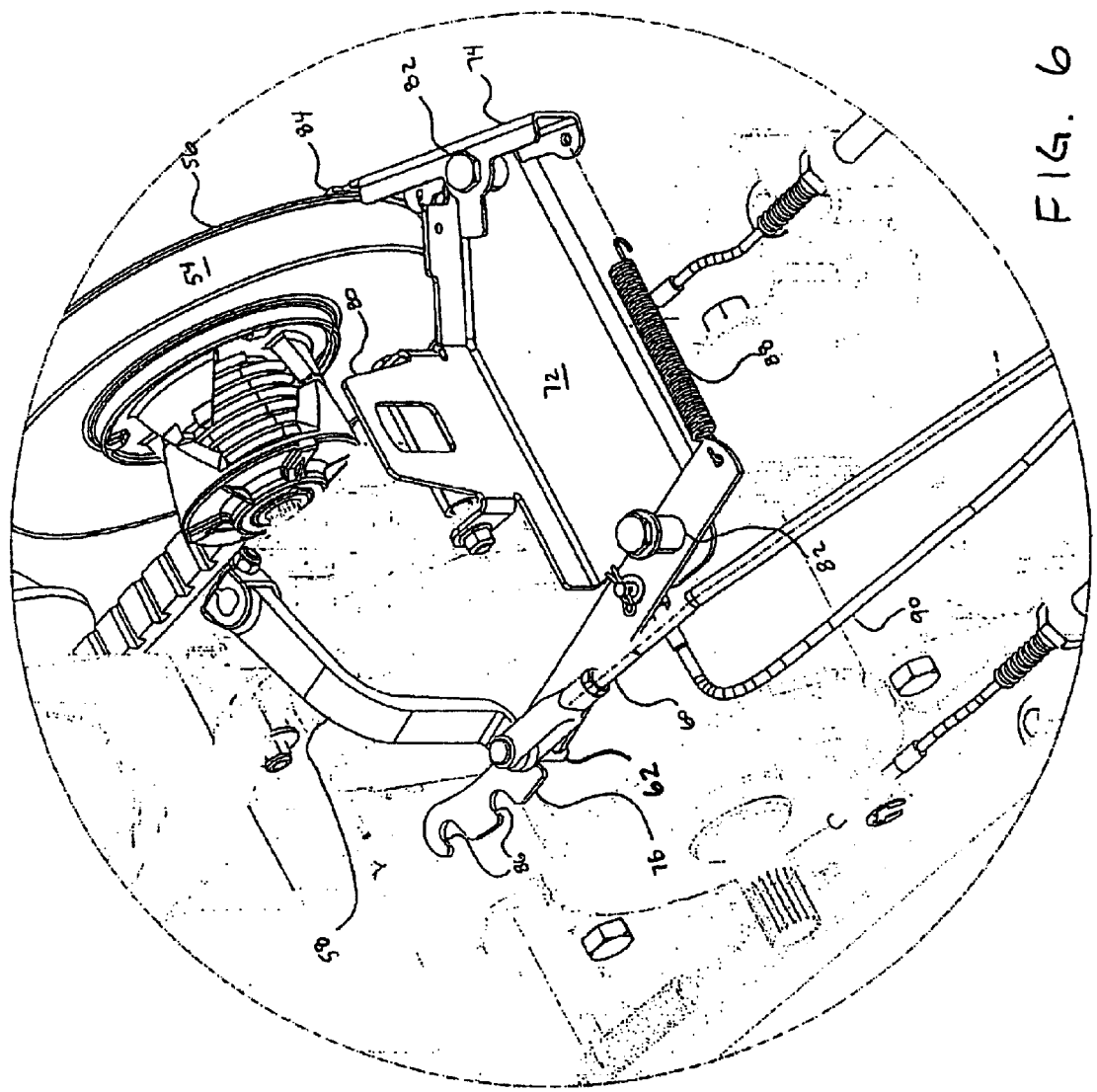
FIG. 6 is a plan view of the utility vehicle showing the transmission and the shift interlock mechanism.
Figure 7:
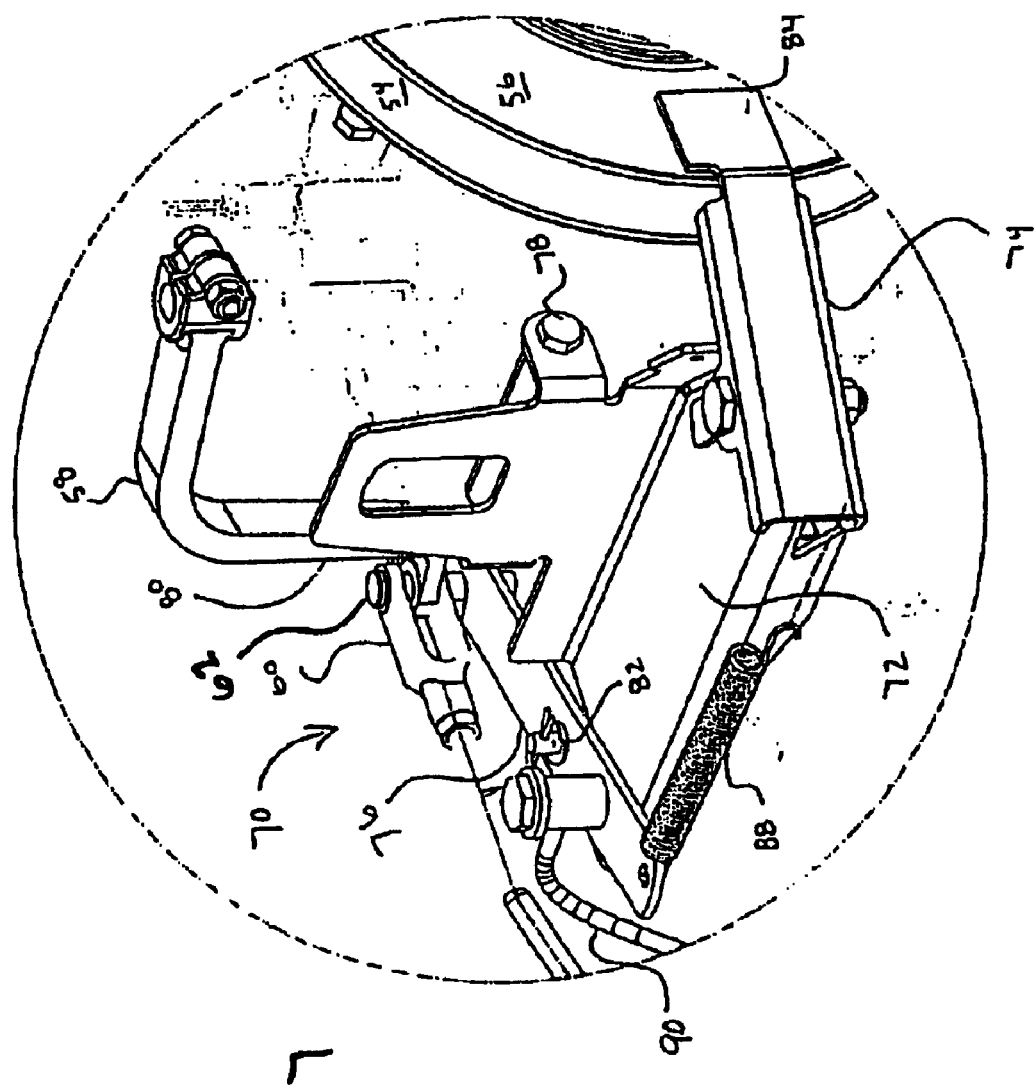
FIG. 7 is a side view of the shift interlock mechanism showing how the brake arm interacts with the torque converter of the transmission.
Figure 8:
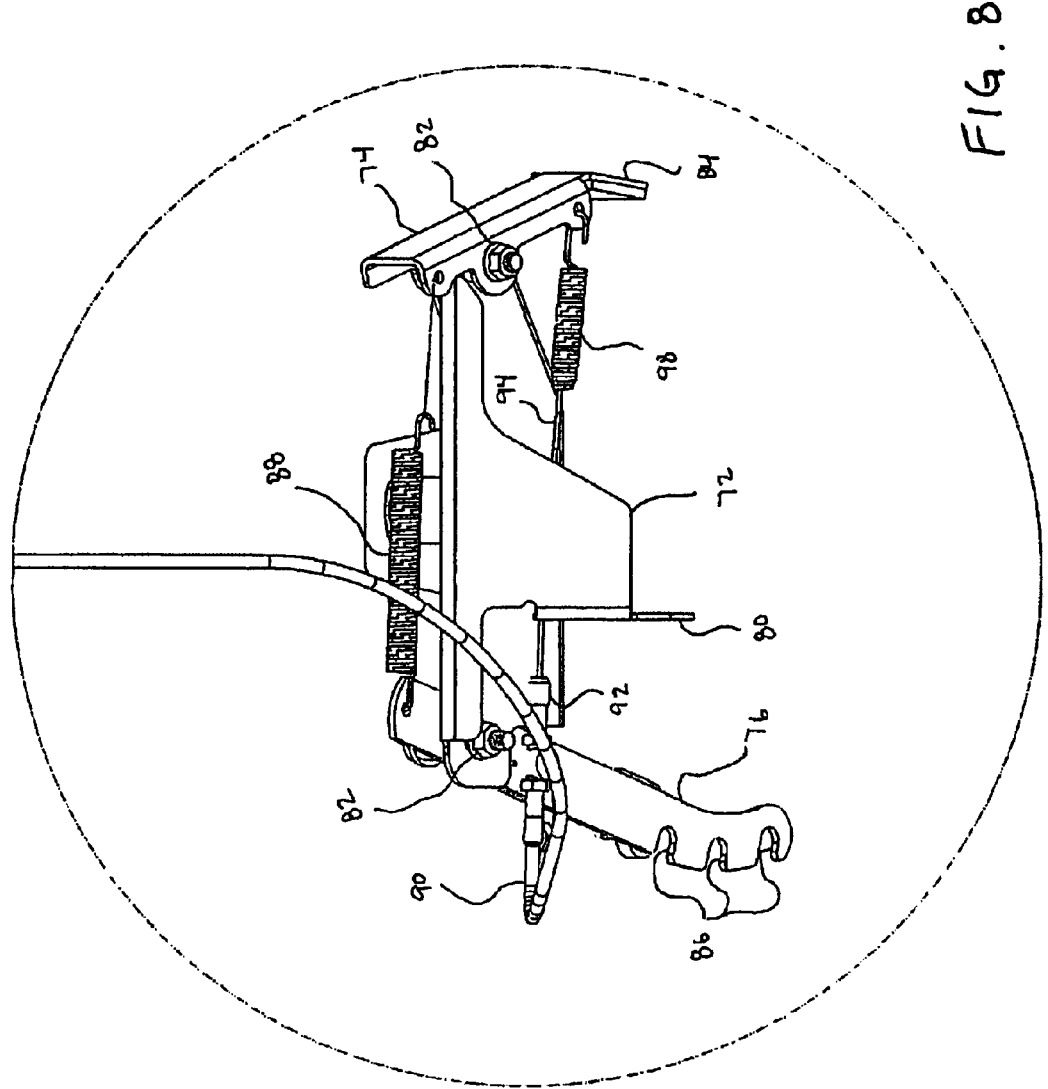
FIG. 8 is a side view of the vehicle showing the transmission locked in a specific position.
Figure 10:
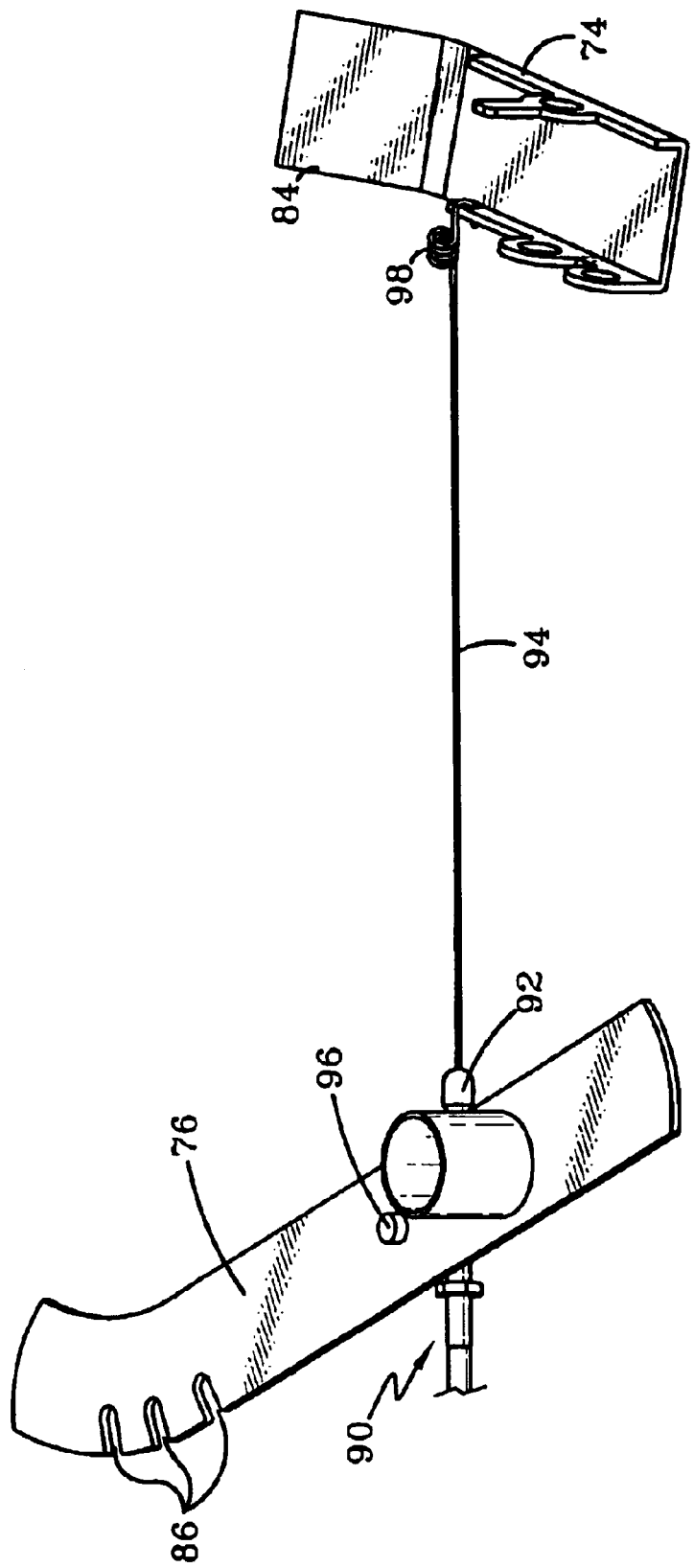
FIG. 10 is a plan view similar to that shown in FIG. 9, except with the illustration of these components when the brake mechanism has not been engaged.
Figure 11:
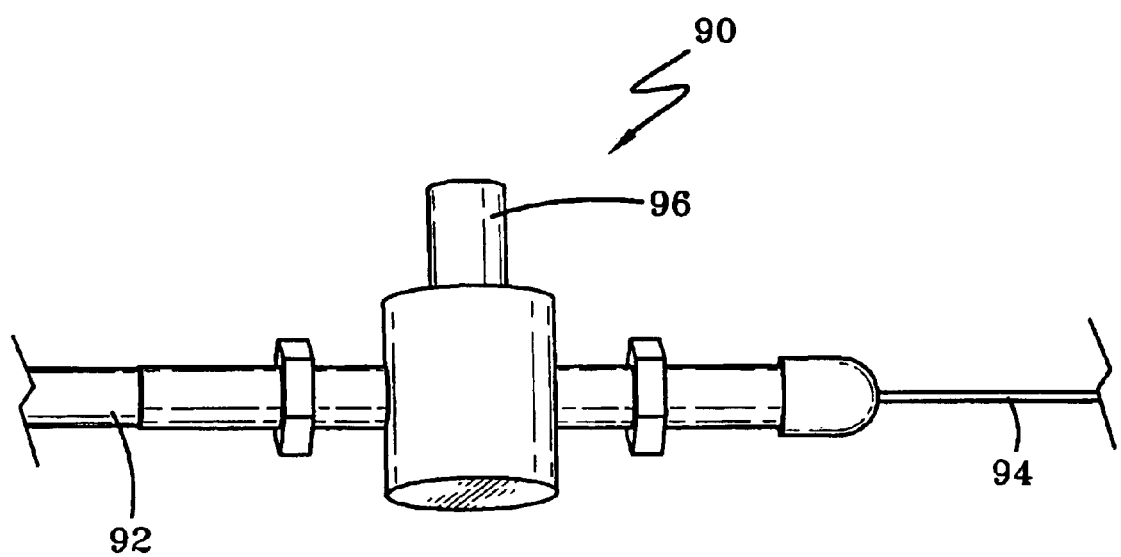
FIG. 11 is a close-up view of the cable shown in FIGS. 9 and 10.

An adjusting member 90 that may be a cable assembly operatively connects the brake mechanism 44 (preferably brake pedal 45) to both the brake arm 74 and shift arm 76. The cable assembly 90 includes a sheath 92 and a cable 94. As is commonly known in the art, the sheath 92 is the outer portion of the cable assembly 90, while the cable 94 is the inner portion of the cable assembly 90. The sheath 92 is connected to the shift arm 76, while the cable 94 is connected to the brake arm 74. In the preferred embodiment, the sheath 92 is connected to a hole or opening in the shift arm 76 via cable pin 96. Thus, the cable pin 96 is pivotally connected to the hole in the shift arm 76. The cable 96 is connected to an opening in the brake arm 74. Preferably, a biasing member 98 that may be a spring member connects the end of the cable 96 to the opening in the brake arm 74. FIGS. 6 and 10 show the shift interlock mechanism 70 in the condition when the operator is not engaging the brake mechanism 44. In this condition, the shift arm 76 is biased such that the grooves 86 receive the pin 62, thus locking the shift member 58 into the particular drive condition. In this condition, the operator cannot change the transmission even by attempting to adjust the shift lever 46. Simultaneously, the brake arm 74 is biased such that the pad 84 does not engage the torque converter 56. Thus, in this condition, the vehicle can be operated according to the current position of the shift member 58 and, thus, the transmission 52 (namely in either drive, neutral or reverse).

Figure 9:
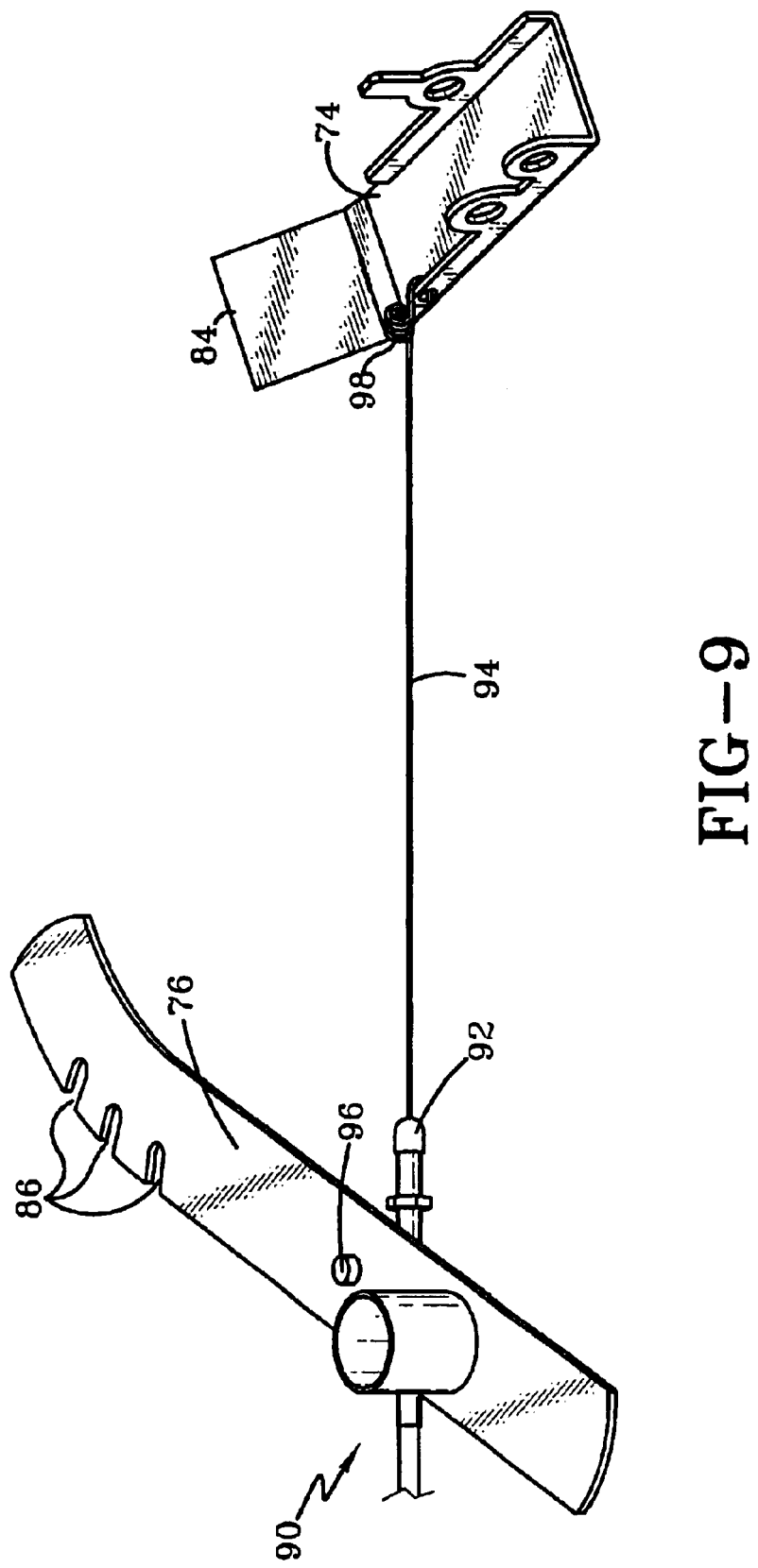
FIG. 9 is a plan view of some of the components from the shift interlock mechanism illustrating their general position when the brake mechanism is engaged.

FIG. 9 shows the shift interlock mechanism 70 in the condition when the operator has engaged the brake mechanism 44. In particular, when the operator presses brake pedal 45, the cable assembly 90 causes the first end of the shift arm 76 to move in a first direction, preferably toward the transmission 52, and also causes the first end of the brake arm 74 to move in a second, preferably opposite direction and to engage the torque converter 56. It should be noted that, when the brake mechanism 44 is engaged by the operator, the brake arm 74 engages the torque converter 56 prior to the shift arm 76 moving such that the pin 62 is no longer received by one of the grooves 86. This sequential action occurs because, with reference to FIG. 3, the distance X1 between the point at which the cable 94 is attached to the brake arm pivot bolt 82 is greater than the distance X2 between the point at which the cable pin 96 engages the shift arm 76 and the pivot bolt 82 of the shift arm 76.

In operation, should the operator attempt to change the position of the shift lever 46 without engaging the brake mechanism 44, he will be unable to do so. This is true because, without engaging the brake mechanism 44, the pin 62 will be positioned within one of the grooves 86 on the shift arm 76. However, when the operator engages the brake mechanism 44 such as by pressing on brake pedal 45, the cable assembly 90 causes the brake arm 74 and shift arm 76 to move from the position shown in FIGS. 8 and 10 to the positions shown in FIGS. 6 and 9. As noted above, when this occurs, the pad 84 on the brake arm 74 engages the torque converter prior to the pin 62 moving out of engagement with one of the grooves 86 of the shift arm 76. When in this second position (shown in FIGS. 6 and 9), the operator can now adjust the shift lever 46 into any position desired. Thus, the shift interlock mechanism 70 of this invention prevents the operator from shifting the transmission until the brake pedal is depressed. The shift interlock mechanism also provides for the stopping of the input shaft to the transmission prior to releasing the shift rod 60, thereby insuring a smoother shifting action.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

We claim:

1. A vehicle comprising:
    a frame;
    at least a first ground engaging drive wheel operatively connected to said frame;
    an engine supported by said frame;
    a transmission assembly supported by said frame operatively connecting said engine to said drive wheel so as to impart rotational movement to said drive wheel, said transmission assembly having a torque converter that is rotated by said engine via a drive belt;
    a brake system operable to retard rotational movement of said drive wheel;
    a shift mechanism operatively connected to said transmission, said shift mechanism being adjustable between at least a forward and a reverse position;
    a shift interlock mechanism comprising;
        a brake arm with a first end adapted to stop motion of said torque converter;
        a shift arm movable between a first locking position in which a first end of said shift arm engages the shift mechanism in a locked condition, whereby movement of the shift mechanism is prevented, and a second non-engaged position in which the shift mechanism is released from the shift arm thereby permitting the shift mechanism to move between said forward, reverse and neutral positions;
        a biasing means operatively connecting said brake arm to said shift arm; and,
        an adjusting member operable in response to operation of said brake system connected to said brake arm and to said shift arm, wherein upon operation of said brake system, said adjusting member moves said brake arm into contact with the torque converter to retard rotational movement of said torque converter, and said adjusting member moves said shift arm to the non-engaged position.

2. The vehicle of claim 1 wherein:
    said shift arm further comprises a plurality of grooves; and,
    said shift mechanism further comprises a member adapted to be received in one of said plurality of grooves.

3. The vehicle of claim 2 wherein said biasing means is operatively connected to said brake arm and said shift arm, wherein said biasing member biases said brake arm into a non-engaging condition with the torque converter, and biases the shift arm into a locked condition with the shift mechanism such that said shift mechanism member is received in one of said plurality of grooves receive.

4. The vehicle of claim 1 wherein said adjusting means is adapted to bias said first end of said shift arm in a first direction and to bias said first end of said brake arm in a second direction.

5. A shift interlock mechanism for use with a vehicle having an engine and at least one ground engaging drive wheel and a transmission connecting said engine to said drive wheel, said transmission having a torque converter rotated by the engine via a drive belt, and a shift mechanism, wherein said shift mechanism is operable between forward, neutral and reverse positions to control operation of said transmission and thus movement of the vehicle, and said shift interlock mechanism comprising:
    a brake arm with a first end configured to contact the torque converter to stop rotational movement of said torque converter;
    a shift arm mounted adjacent the shift mechanism, the shift arm movable between a first locking position in which a first end of said shift arm engages the shift mechanism in a locked condition, whereby movement of the shift mechanism is prevented, and a second non-engaged position in which the shift mechanism is released from the shift arm thereby permitting the shift mechanism to move between said forward, reverse and neutral positions; and,
    a cable assembly operatively connected to said brake arm and to said shift arm.

6. The shift interlock mechanism of claim 5 further comprising a supporting means adapted to said brake arm at a first pivot point and said supporting means operatively connected to said shift arm at a second pivot point.

7. The shift interlock mechanism of claim 6 wherein said cable assembly is operatively connected to said brake arm at a distance X1 from said first pivot point and wherein the adjusting member is operatively connected to said shift arm a distance X2 from said second pivot point, wherein the distance X1 is greater than the distance X2, and wherein actuation of said cable assembly causes said brake arm to engage the torque converter and then causes said shift arm to move to said non-engaged position.

8. The shift interlock mechanism of claim 5 wherein said cable assembly further comprises a bias member operatively adapted to a first end of said cable.

9. The shift interlock mechanism of claim 8 wherein said bias member is adapted to operatively connect said cable to said brake arm.

10. A shift interlock mechanism for use with a vehicle having an engine and at least one ground engaging drive wheel and a transmission connecting said engine to said drive wheel, said transmission having a torque converter rotated by the engine via a drive belt, and a shift mechanism, wherein said shift mechanism is operable between forward, neutral and reverse positions to control operation of said transmission and thus movement of the vehicle, and said shift interlock mechanism comprising:
    a brake arm with a first end configured to contact the torque converter to stop rotational movement of said torque converter;
    a shift arm mounted adjacent the shift mechanism, the shift arm movable between a first locking position in which a first end of said shift arm engages the shift mechanism in a locked condition, whereby movement of the shift mechanism is prevented, and a second non-engaged position in which the shift mechanism is released from the shift arm thereby permitting the shift mechanism to move between said forward, reverse and neutral positions;

a biasing member operatively connecting said brake arm to said shift arm; and, an adjusting member connected to said brake arm and to said shift arm, the adjusting member being operable in response to operation of said brake, wherein upon operation of said brake, said adjusting member moves said brake arm into contact with the torque converter to retard rotational movement of said torque converter, and said adjusting member moves said shift arm to the non-engaged position.

11. The shift interlock mechanism of claim 10 wherein said adjusting member biases said brake arm in a first direction and said shift arm in a second direction.

12. The shift interlock mechanism of claim 10 further comprising a connecting means operatively connecting said brake arm to said shift arm.

13. The shift interlock mechanism of claim 12 further comprising a first pivot point at connection of said connection means with said brake arm and a second pivot point at connection of said connection means with said shift arm.

14. The shift interlock mechanism of claim 13 wherein said adjusting means is operatively connected to said brake arm at a distance X1 from said first pivot point and wherein the adjusting member is operatively connected to said shift arm a distance X2 from said second pivot point, wherein the distance X1 is greater than the distance X2.

15. The shift interlock mechanism of claim 10 further comprising:
    said shift arm comprising a plurality of grooves; and,
    a shift mechanism member adapted to be received in one of said plurality of grooves.

16. The shift interlock mechanism of claim 15 wherein said biasing member biases said first end of said brake arm in a first direction and biases said first end of said shift arm in a second direction.

17. The shift interlock mechanism of claim 16 wherein said adjusting member biases said brake arm into engagement with the torque converter stopping motion of said torque converter.

18. The shift interlock mechanism of claim 16 wherein said shift mechanism member is received in one of said plurality of grooves upon movement of said shift arm in said second direction.

19. A vehicle having a shift interlock mechanism for locking a transmission shift mechanism of the vehicle, the vehicle comprising:
    a frame;
    at least a first ground engaging drive wheel operatively connected to said frame;
    an engine supported by said frame;
    a transmission assembly supported by said frame operatively connecting said engine to said drive wheel so as to impart rotational movement to said drive wheel, said transmission assembly having a torque converter that is rotated by said engine via a drive belt;
    a brake system operable to retard rotational movement of said drive wheel;
    a shift mechanism operatively connected to said transmission, said shift mechanism being adjustable between forward, neutral and reverse positions so as to control operation of said transmission;
        a shift interlock mechanism operatively connected to said transmission, said shift interlock mechanism comprising;
        a brake arm with a first end configured to contact the torque converter to stop rotational movement of said torque converter;
        a shift arm mounted adjacent the shift mechanism, the shift arm movable between a first locking position in which a first end of said shift arm engages the shift mechanism in a locked condition, whereby movement of the shift mechanism is prevented, and a second non-engaged position in which the shift mechanism is released from the shift arm thereby permitting the shift mechanism to move between said forward, reverse and neutral positions;
        a biasing member operatively connecting said brake arm to said shift arm; and, an adjusting member connected to said brake arm and to said shift arm, the adjusting member being operable in response to operation of said brake, wherein upon operation of said brake, said adjusting member moves said brake arm into contact with the torque converter to retard rotational movement of said torque converter, and said adjusting member moves said shift arm to the non-engaged position.

20. The vehicle according to claim 19 further comprising a biasing member operatively connecting said brake arm to said shift arm, wherein said biasing member biases said brake arm into a non-engaging condition with the torque converter, and biases the shift arm into a locked condition with the shift mechanism.

21. The vehicle according to claim 19 further comprising a bracket operatively connecting said brake arm to said shift arm, said brake arm pivotally connected to the bracket at a first pivot point and the shift arm pivotally connected to the bracket at a second pivot point, wherein the adjusting member is mounted on said brake arm at a distance X1 from said first pivot point and said adjusting member is mounted on said shift arm a distance X2 from said second pivot point, wherein the distance X1 is greater than the distance X2.

* * * * *